United States Patent
Sugimoto

(10) Patent No.: US 10,011,239 B2
(45) Date of Patent: Jul. 3, 2018

(54) COMMUNICATION SYSTEM

(71) Applicant: YAZAKI CORPORATION, Tokyo (JP)

(72) Inventor: Terumitsu Sugimoto, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/703,038

(22) Filed: Sep. 13, 2017

(65) Prior Publication Data

US 2018/0072249 A1 Mar. 15, 2018

(30) Foreign Application Priority Data

Sep. 14, 2016 (JP) ................. 2016-179826

(51) Int. Cl.
*B60R 16/02* (2006.01)
*B60R 16/023* (2006.01)
*H04L 29/12* (2006.01)

(52) U.S. Cl.
CPC ...... *B60R 16/0231* (2013.01); *H04L 61/2038* (2013.01)

(58) Field of Classification Search
CPC .............. B60R 16/0231; H04L 61/2038
USPC .................................. 340/286.02
See application file for complete search history.

(56) References Cited

U.S. PATENT DOCUMENTS 2,773,937 A * 12/1956 Morris ............... H04Q 11/04
370/359
3,223,785 A * 12/1965 Drew ................ H04Q 3/545
379/11

FOREIGN PATENT DOCUMENTS

JP 2011-151622 A 8/2011

* cited by examiner

*Primary Examiner* — Allen T Cao
(74) *Attorney, Agent, or Firm* — Kenealy Vaidya LLP

(57) ABSTRACT

A communication system includes a control device and a plurality of electric units configured to be connected to the control device respectively to communicate with each other, and each of the plurality of electric units having a unique identifier. Each of the plurality of electric units comprises a resistor configured to set the corresponding identifiers. The respective resistors of the plurality of electric units are connected to each other in series to form a setting circuit. The control device is configured to determine the corresponding identifiers of the plurality of respective electric units based on magnitudes of respective voltages applied to the plurality of respective resistors in the setting circuit, and to send signals indicating the determined identifiers to the plurality of electric units, respectively.

4 Claims, 7 Drawing Sheets

| ID SETTING VOLTAGE | Va | Vb | Vc | --- |
|---|---|---|---|---|
| ELECTRIC UNIT | 30a | 30b | 30c | --- |
| ID ASIGNED | IDa | IDb | IDc | --- |

COMMUNICATION SYSTEM

CROSS REFERENCE TO RELATED APPLICATIONS

This application is based on Japanese Patent Application (No. 2016-179826) filed on Sep. 14, 2016, the contents of which are incorporated herein by reference.

BACKGROUND OF THE INVENTION

1. Field of the Invention

The present invention relates to a communication system in which a control device and each of plural electric units are connected to each other so as to be able to communicate with each other.

2. Description of the Related Art

In recent years, a wide variety of electric devices have come to be installed in vehicles such as automobiles. And, in general, such electric devices are distributed at various locations on a vehicle body. For example, electric devices relating to the running of the vehicle, ones relating to audio, and ones relating to vehicle body functions, and other ones are disposed at various locations such as a steering column, and a center cluster (and a center console). In general, each of such electric devices is equipped with various switches, various sensors, and various relays, etc.

To allow such electric devices to operate, power is supplied to them from vehicle power sources (e.g., vehicle battery and alternator). And signals generated by switches, sensors, etc. provided in an electric device may be transmitted to various electronic control units (ECUs) or other kinds of electric devices.

For example, there is one conventional electric unit (hereinafter referred to as a conventional unit) that is used as a slave communication device that is connected to a master ECU via a vehicle network. Equipped with a computing unit, the conventional unit (slave communication device) controls various electric devices (e.g., turn switch, and headlights) on its own by calculating their operation amounts on the basis of various kinds of information received from them and other kinds of information (refer to JP-A-2011-151622, for example).

Incidentally, to control electric devices actually in a conventional system, individual slave communication devices are given unique identifiers (IDs). On the other hand, in vehicles, the number and the kinds of electric devices (e.g., lamps and electric motor) connected to the system vary depending on the vehicle type, the vehicle grade, the sales area, the presence/absence of various options desired by a user, and other factors. As a result, in general, in vehicle communication systems, identifiers (IDs) of slave communication devices are determined as appropriate according to the actual system configuration and the vehicle type.

For example, in conventional systems, a variety of slave communication units that are assigned unique identifiers (IDs) are prepared in advance and a master ECU recognizes the identifier (ID) of a slave communication unit that is connected to it when, for example, a network is constructed first or every time a new function is added to a constructed network. However, since a number of electric units are installed in vehicles according to a wide variety of electric devices, in conventional systems a process of having a master ECU recognize identifiers (IDs) may become complex. From the viewpoint of constructing a system as easily as possible, it is desired that identifiers (IDs) be assigned as easily as possible.

SUMMARY OF THE INVENTION

The present invention has been made in view of the above circumstances, and an object of the invention is therefore to provide a communication system in which identifiers of electric units constituting it can be set easily.

To attain the above object, the invention provides a communication system that is summarized in the form of the following items (1)-(4):

(1) A communication system including:
a control device; and
a plurality of electric units configured to be connected to the control device respectively to communicate with each other, and each of the plurality of electric units having a unique identifier, wherein:
each of the plurality of electric units includes a resistor configured to set the corresponding identifiers,
the respective resistors of the plurality of electric units are connected to each other in series to form a setting circuit, and
the control device is configured to determine the corresponding identifiers of the plurality of respective electric units based on magnitudes of respective voltages applied to the plurality of respective resistors in the setting circuit, and to send signals indicating the determined identifiers to the plurality of electric units, respectively.

(2) The communication system according to item (1), wherein:
the control device configured to determine target operation amounts of a plurality of electric devices that are control targets of the communication system,
each of the plurality of electric units includes:
a communication port that is disposed so as to relay between a corresponding one of the plurality of electric devices and the control device, and is configured to be connected to a communication wire connected to the control device;
a power port that is configured to be connected to a power wire connected to an external power source,
a ground port that is configured to be connected to a ground wire,
electric device ports configured to output power to the corresponding ones of the plurality of electric devices, and
setting ports configured to constitute the setting circuit, and
each of the plurality of electric units receives a signal indicating the corresponding target operation amount from the control device via the corresponding communication port, prepares operation power corresponding to the target operation amount using power received via the corresponding power port, and controls the corresponding one of the plurality of electric devices to operate so that an actual operation amount of the corresponding one of the plurality of electric devices becomes equal to the corresponding target operation amount by supplying the prepared power to the corresponding one of the plurality of electric devices via the corresponding one of the electric device ports.

(3) The communication system according to item (2), wherein:

the setting circuit includes a part of the communication wire for communication between the control device and the plurality of electric units or is constituted as a circuit that is independent of and separate from the communication wire.

(4) The communication system according to any one of items (1)-(3), wherein:

the respective resistors of the plurality of electric units have the same resistance.

In the communication system having the configuration of item (1), the setting circuit is formed in which the resistors of the respective electric units are connected to each other in series. In the setting circuit (series circuit), since a voltage drop corresponding to its resistance occurs at each resistor, the voltage of the resistor (e.g., the voltage at a position immediately downstream of the resistor) varies from one resistor to another. In other words, the voltage of the resistor varies from one electric unit to another. Utilizing this feature, the control device determines identifiers of the respective electric units according to the magnitudes of different voltages of the respective resistors. In other words, no identifiers are set for the electric units in advance and identifiers are set for the respective electric units after installation of the electric units in the communication system. The control device may communicate thus-set identifiers to the respective electric units by any method. Thus, the installation of the electric units in the communication system and the assignment of identifiers are made easier than in the case of using electric units that are assigned identifiers in advance as in conventional systems.

As such, the communication system having the above configuration can easily set identifiers of the electric units which constitute the communication system.

In the communication system according to item (2), although each electric unit has the function of allowing the corresponding electric device to operate, it does not determine an operation amount of the electric device on its own and allows the associated electric device to operate according to an instruction (i.e., a signal indicating a target operation amount) from the control device 20. In other words, each electric unit itself makes no judgment as to how the associated electric unit should operate and merely allows the associated electric device to operate according to an instruction from the control device.

Thus, each electric unit of the communication system having the above configuration is more versatile than conventional electric units because the former need not be provided with a function of making a judgment as to operation of the associated electric device. For example, where the associated electric device is a PWM-controlled motor, it suffices that the electric unit have only a function of generating PWM control pulses according to an instruction from the control device. This makes it possible to use a common electric unit for various motors, which means increase in versatility. As such, the electric units of the communication system having the above configuration are highly versatile.

The electric units of the communication system having the above configuration provide another advantage (simplification of the configuration). More specifically, where as in the conventional case each electric unit (slave communication device) allows the associated electric device to operate by making a judgment on its own, a design that would be employed ordinarily is that each electric unit incorporates a control IC (e.g., microcomputer) that is configured so as to be able to perform relatively complex processing. On the other hand, since each electric unit of the communication system having the above configuration allows the associated electric device to operate according to an instruction from the control device (need not be provided with a function of making a judgment as to operation of the electric device), even if the electric unit incorporates a control IC, its configuration can be made simpler than in conventional control units. For example, the number of gate circuits (or gate ICs) can be made smaller than in conventional control units. Furthermore, depending on the processing to perform, each electric unit can be a logic IC that is simpler in configuration than what is called microcomputers etc. As such, each electric unit of the communication system having the above configuration can be made simpler in configuration than conventional control units.

The above-mentioned term "target operation amount" of an electric device is a concept that includes not only a target value of its operation amount (e.g., a motor rotation speed) but also its target operation start/end (on/off) timing etc.

According to the communication system having the configuration of item (3), part of the communication wire for communication between the control device and the electric units can also be used as a part of the setting circuit. This simplifies the configuration of the entire communication system, whereby cost reduction etc. of the communication system is expected. On the other hand, where a circuit that is separate from the communication wire is provided as a part of the setting circuit, a phenomenon can be avoided that a signal that is sent from the control device to an electric unit (i.e., a control signal that travels through the setting circuit) is attenuated due to the identifier-setting resistors.

According to the communication system having the configuration of item (4), the resistors having the same resistance are provided in the respective electric units. Thus, each electric unit can be made lower in manufacturing cost and higher in versatility than in a case that the resistance of the corresponding resistor varies from one electric unit to another (i.e., the electric units have different specifications).

The invention can provide a communication system in which identifiers of electric units constituting it can be set easily.

The invention has been described above concisely. The details of the invention will become more apparent when the modes for carrying out the invention (hereinafter referred to as embodiments) described below are read through with reference to the accompanying drawings.

DETAILED DESCRIPTION OF THE EXEMPLARY EMBODIMENTS

Embodiment 1

A vehicular communication system (hereinafter referred to as a "communication system 1") according to a first embodiment of the present invention will be hereinafter described with reference to the drawings.

Figure 1:
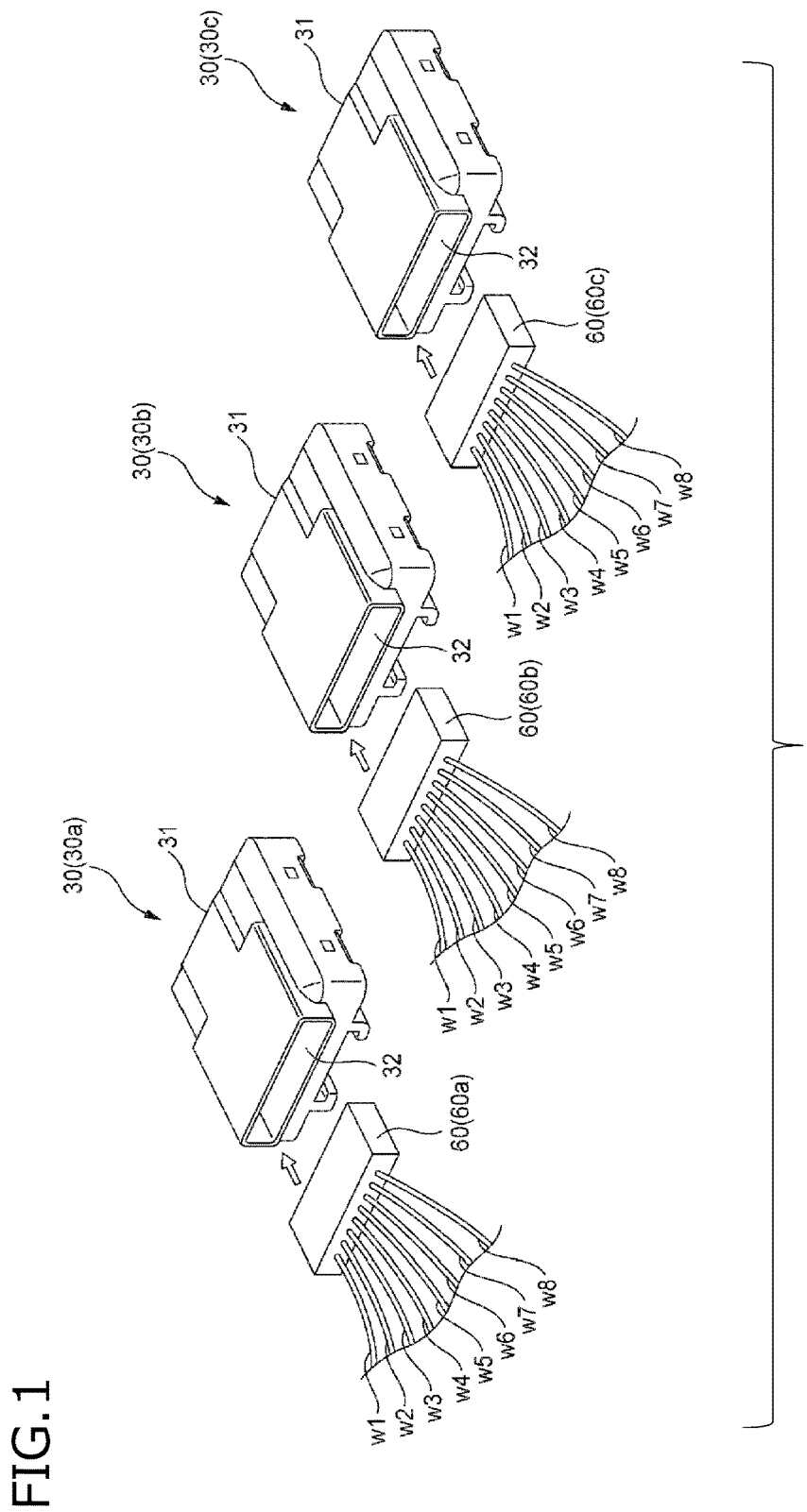
FIG. 1 is a perspective view of electric units that are used in a communication system according to a first embodiment of the present invention.
Figure 2:
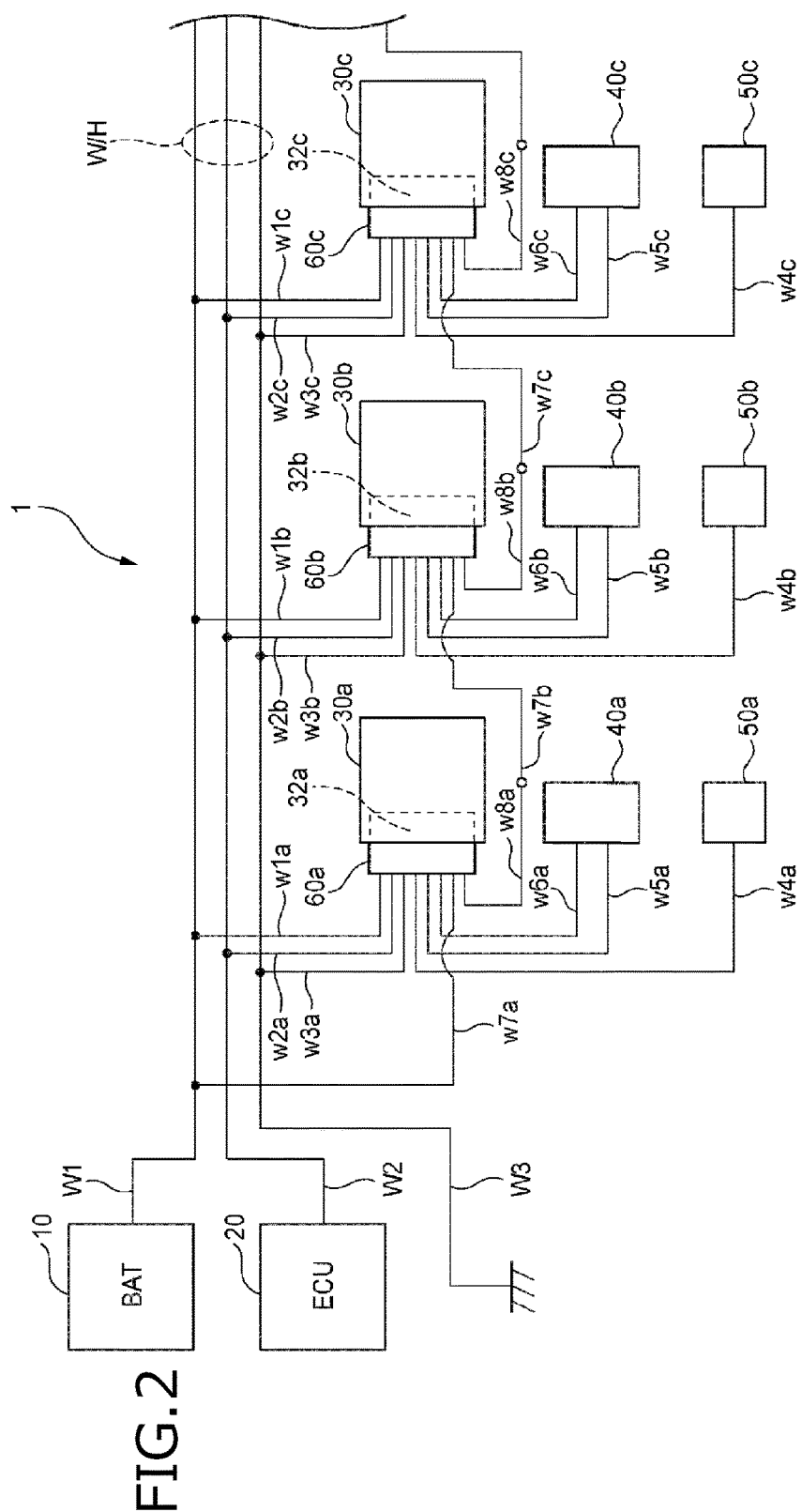
FIG. 2 is a block diagram outlining the communication system according to the first embodiment of the invention.

As shown in FIGS. 1 and 2, in the communication system 1, each of plural electric units 30 (30a, 30b, and 30c) is disposed so as to enable relaying between one of plural electric devices 40 (40a, 40b, 40c) and a control device 20 and has a function of allowing the former to operate according to an instruction from the latter.

The communication system 1 shown in FIG. 2 employs three electric units 30 (30a, 30b, and 30c). However, there are no particular limitations on the number of electric units 30 except that it should be plural; either two electric units 30 or four or more electric units 30 may be used.

For convenience of the following description, elements relating to only the electric units 30a, elements relating to only the electric units 30b, and elements relating to only the electric units 30c will be given symbols having suffixes "a," "b," and "c," respectively. When it is not necessary to discriminate elements that should be given symbols having the suffixes "a," "b," and "c" as long as the above rule is followed, the suffixes "a," "b," and "c" will be omitted. As for wires, trunk wires will be given symbols that start with "W" and other wires such as branch wires that branch off trunk wires will be given symbols that start with "w."

As shown in FIG. 1, each electric unit 30 is equipped with a resin housing 31 which covers it entirely. The housing 31 houses a control IC such as a microcomputer (processing unit 33 shown in FIG. 3 (described later)), switching elements such as FETs (drive unit 34 shown in FIG. 3 (described later)) and other components.

The housing 31 is formed with a connector portion 32 to be fitted with and connected to a counterpart connector 60. Various ports P1-P8 (see FIG. 3; described later) are arranged in the connector portion 32 adjacent to the same side of the housing 31. In other words, the housing 31 and the ports P1-P8 are resin-molded together so that the ports P1-P8 are arranged adjacent to the same side of the housing 31 (and assumes a connector-like shape). When the counterpart connector 60 is fitted into and connected to the connector portion 32, the ports P1-P8 are connected to various wires w1-w8, respectively, which are connected to the counterpart connector 60.

No identifier (ID) is set for each electric unit 30 in advance. After each electric unit 30 is attached to the communication system 1 by fitting and connecting the counterpart connector 60 into and to the connector portion 32 of the electric unit 30, an identifier (ID) is set for the electric unit 30 as described later. As described later, each electric unit 30 allows the electric device 40 that it relays to operate according to an instruction from the control device 20.

As shown in FIG. 2, the communication system 1 is equipped with a wire harness W/H which consists of a power wire W1, a communication wire W2, and a ground wire W3 which are trunk wires. The power wire W1 is connected to a main battery (BAT) 10 which is a main power source of a vehicle. An output voltage Vbat (e.g., DC 12 V) of the battery 10 is supplied to the power wire W1 as power-source power.

The communication wire W2 is connected to the control device (ECU) 20 for controlling various electric devices mounted on the vehicle including the electric devices 40. The communication wire W2 has a function of transmitting a signal between the control device 20 and each electric unit 30 and between electric units 30. The ground wire W3 is grounded and its potential is always kept at 0 V.

One ends of a power wire w1, a communication wire w2, a ground wire w3, and signal wires w4-w8 are connected to the counterpart connector 60 that is connected to the connector portion 32 of each electric unit 30. The other end of each power wire w1 is connected to the power wire W1 of the wire harness W/H, the other end of each communication wire w2 is connected to the communication wire W2 of the wire harness W/H, and the other end of each ground wire w3 is connected to the ground wire W3 of the wire harness W/H.

The positions in the longitudinal direction of the wire harness W/H where the other ends of the power wire w1, the communication wire w2, and the ground wire w3 of each electric unit 30 are connected to the power wire W1, the communication wire W2, and the ground wire W3, respectively, vary from one electric unit 30 to another. In other words, the position in the longitudinal direction of the wire harness W/H where each electric unit 30 is connected to the wire harness W/H varies from one electric unit 30 to another. In the communication system 1, the electric unit 30a is connected to the wire harness W/H at an uppermost position (i.e., at a position closest to the control device 20), the electric unit 30b is connected to the wire harness W/H at a position more downstream (i.e., more distant from the control device 20) than the electric unit 30a is, and the electric unit 30c is connected to the wire harness W/H at a position more downstream than the electric unit 30b is.

The other ends of each set of signal wires w5 and w6 are connected to the electric device 40 that the associated electric unit 30 relays. The other end of each signal wire w4 is connected to a switch that relate to turning on/off of the electric device 40 that the associated electric unit 30 relays and/or a sensor for measuring a parameter relating to turning on/off of the electric device 40 (hereinafter referred to as a switch or the like 50).

Each electric device 40 is an electric device (load) mounted in the vehicle and is, more specifically, a motor, a lamp, a solenoid, or the like. Example motors are motors for driving outer mirrors, motors for driving seat belt anchors, and a driver for driving a sunshade. Examples lamps are inside foot illumination lamps, outside foot illumination lamps, and roof illumination lamps. Example solenoid coils are solenoid coils for various electromagnetic valves.

The electric devices 40a, 40b, and 40c may be either loads of the same kind (e.g., motors) or loads of different kinds (e.g., a motor(s) and a lamp(s)). A switch or the like 50a, a switch or the like 50b, and a switch or the like 50c are switches or the like relating to turning-on/off of the electric devices 40a-40c, respectively.

The other end of the signal wire w7a relating to the most upstream electric unit 30a is connected to the power wire W1. Thus, the voltage of the signal wire w7a is the output voltage Vbat of the battery 10.

The other end of the signal wire w8a relating to the most upstream electric unit 30a is connected to the other end of the signal wire w7b relating to the electric unit 30b which is located immediately downstream of the electric unit 30a. The other end of the signal wire w8b relating to the electric unit 30b is connected to the other end of the signal wire w7c relating to the electric unit 30c which is located immediately downstream of the electric unit 30b. The other end of the signal wire w8c relating to the electric unit 30c is connected to the other end of a signal wire w7 relating to an electric unit 30 (not shown) that is located immediately downstream of the electric unit 30c if it exists. The other end of a signal wire w8 relating to a most downstream electric unit 30 is grounded.

Figure 3:
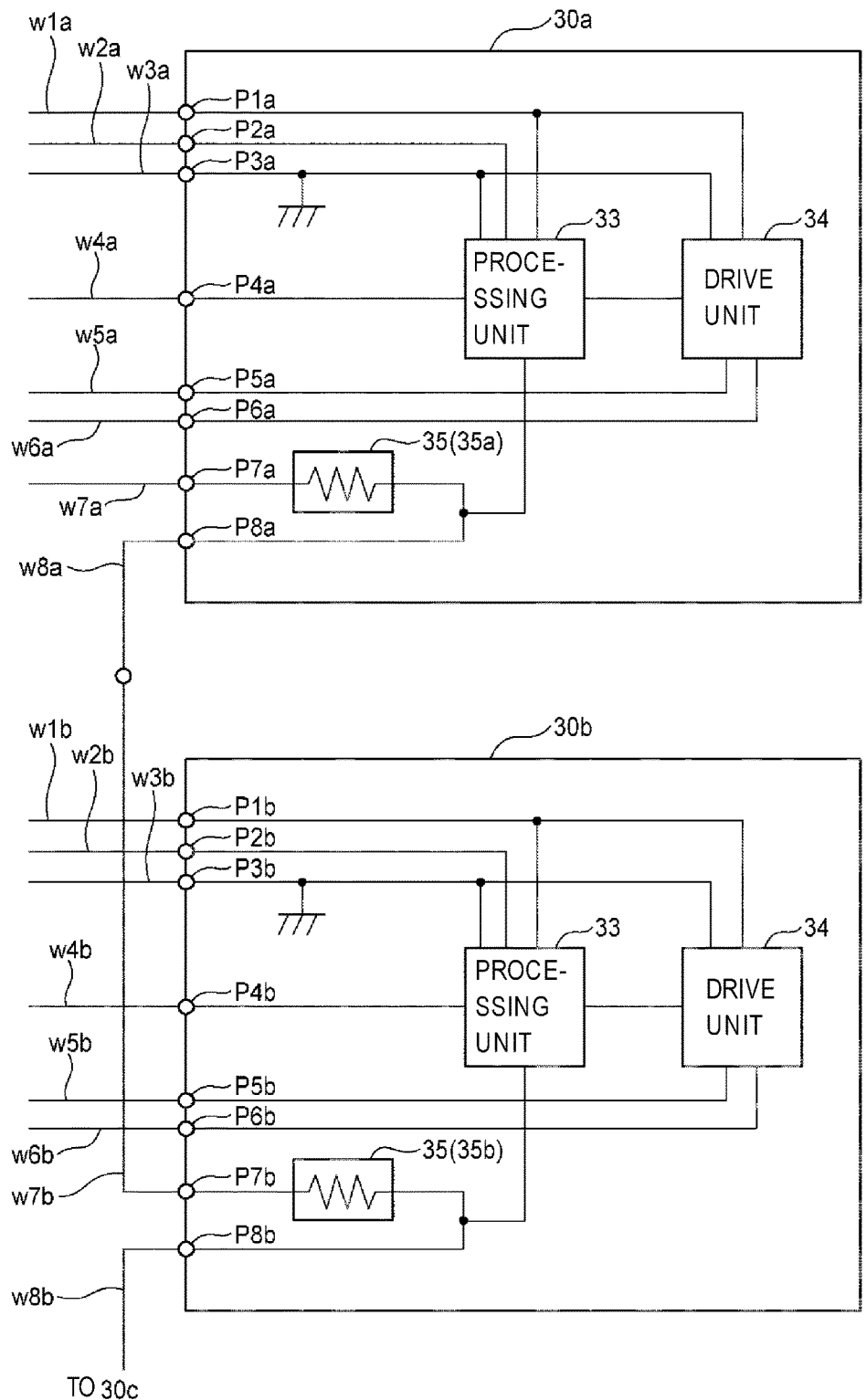
FIG. 3 is a functional block diagram of part of the electric units shown in FIG. 1.

As shown in FIG. 3, each electric unit 30 is equipped with a power port P1, a communication port P2, a ground port P3, and signal ports P4-P8 to which the power wire w1, the communication wire w2, the ground wire w3, and the signal wires w4-w8 of the counterpart connector 60 can be connected, respectively. The wires w1-w8 are connected to the respective port P1-P8 together when the counterpart connector 60 is fitted into and connected to the connector portion 32 of each electric unit 30.

As shown in FIG. 3, each electric unit 30 is equipped with a processing unit 33 which is a control IC such as a microcomputer, a drive unit 34 which is composed of plural switching elements (FETs), and a resistor 35. The processing units 33, the drive units 34, and the resistors 35 of the respective electric units 30 have the same specifications. That is, the resistors 35 of the respective electric units 30 have the same resistance.

The processing unit 33 is connected to the power port P1, the communication port P2, the ground port P3, and the signal port P4 and P8, and the drive unit 34. The drive unit 34 is connected to the power port P1, the ground port P3, the signal port P5 and P6, and the processing unit 33. One end of the resistor 35 is connected to the signal port P7 and its other port is connected to the signal port P8. As such, the processing unit 33 can detect a voltage at the other end of the resistor 35 (i.e., a voltage at the signal port P8).

Attention is now paid to the manner of connections between the signal ports P7 and P8, the resistor 35 of each electric unit 30, and the signal wires w7 and w8. In a state that the electric units 30 are connected to the respective counterpart connectors 60, a circuit "the battery 10→power wire W1→signal wire w7a→resistor 35a→signal wires w8a and w7b→resistor 35b→signal wires w8b and w7c→resistor 35c→signal wire w8c→ . . . →ground" is configured in which the plural resistors 35 having the same resistance are connected to each other in series.

As described later, this circuit is used for setting an identifier (ID) of each electric unit 30. In the following, this circuit will be referred to as a "setting circuit" and the voltage at each signal port P8 (i.e., the voltage immediately downstream of each resistor 35) will be referred to as an "ID setting voltage Vid."

Figures 4A, 4B:
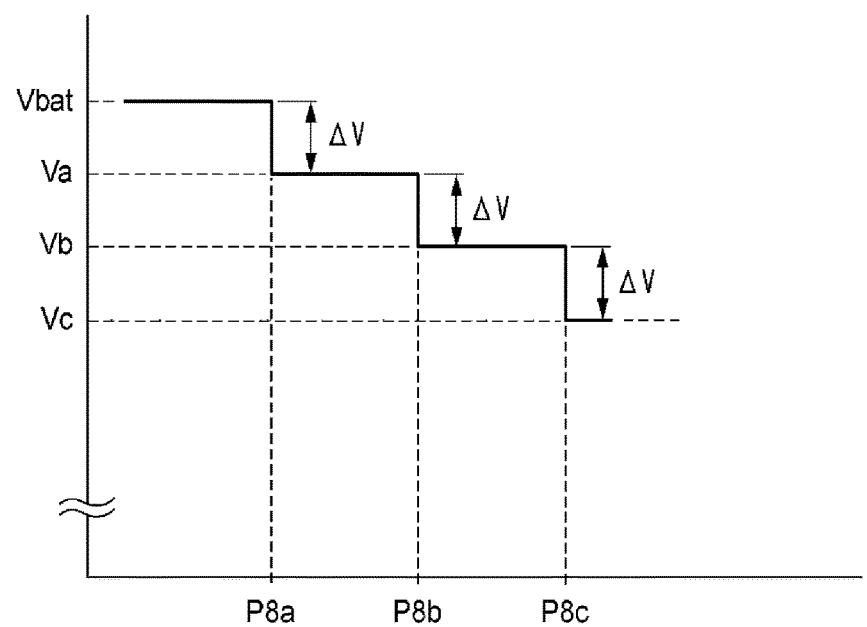
FIG. 4A is a graph showing relationships between plural signal ports P8 and voltages occurring there.
FIG. 4B is a table showing relationships between ID setting voltages and corresponding identifiers (IDs) assigned.

In the setting circuit, a voltage drop ΔV occurs in each resistor 35. As shown in FIG. 4A, the voltage (=Vid) at the signal port P8a of the electric unit 30a is equal to Vbat−ΔV (=Va), the voltage (=Vid) at the signal port P8b of the electric unit 30b is equal to Vbat−2ΔV (=Vb), and the voltage (=Vid) at the signal port P8c of the electric unit 30b is equal to Vbat−3ΔV (=Vc).

Thus, the processing unit 33 of the electric unit 30 can detect the ID setting voltage Vid that is equal to Va when the electric unit 30 is connected to the counterpart connector 60a, the ID setting voltage Vid that is equal to Vb when it is connected to the counterpart connector 60b, and the ID setting voltage Vid that is equal to Vc when it is connected to the counterpart connector 60c. The processing unit 33 sends the thus-detected ID setting voltage Vid to the control device 20 from the signal port P2. In doing so, the processing unit 33 may also send information relating to the type of the electric device (e.g., a type number of a motor) that it relays.

Figure 5:
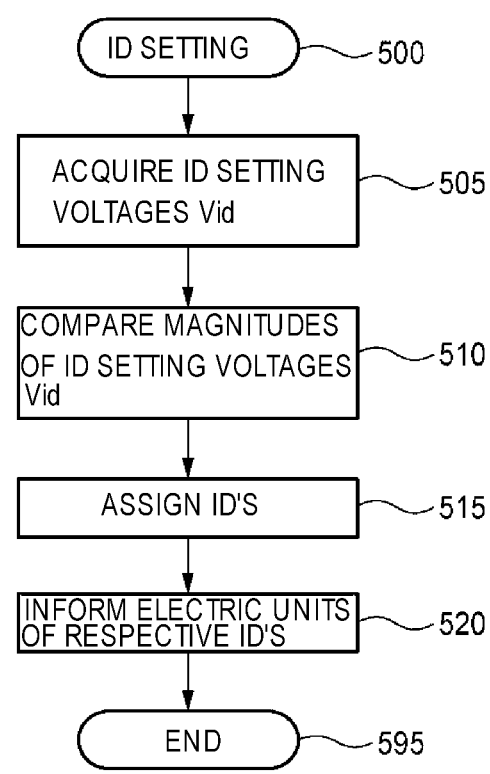
FIG. 5 is a flowchart of a process that is executed by a processing unit of each electric unit to set an identifier (ID).

After receiving the ID setting voltages Vid from the respective processing units 33, the control device 20 determines identifiers (IDs) of the respective electric units 30 utilizing the above-described stepwise voltage drops. A process to be executed by the control device 20 to set identifiers (IDs) will be described below with reference to FIG. 5. The process shown in FIG. 5 is executed with prescribed timing after the electric units 30 are connected to the respective counterpart connectors 60.

This process is started at step S500. At step S505, the control device 20 receives signals (i.e., voltages at the respective signal ports P8) that are sent from the communication ports P2 of the electric units 30 and indicate ID setting voltages Vid, respectively. At step S510, the control device 20 compares the magnitudes of the acquired ID setting voltages Vid of the respective electric units 30. For example, since the magnitudes of the acquired ID setting voltages Vid (i.e., Va, Vb, and Vc) vary from one electric unit 30 to another, as shown in FIG. 4B the electric units 30 can be discriminated from each other on the basis of (i.e., by comparing) the magnitudes of the acquired ID setting voltages Vid.

At step S515, the control device 20 assigns identifiers (IDs) to the respective electric units 30 on the basis of results of the comparison. For example, in this embodiment, since the ID setting voltages Vid have a relationship Va→Vb→Vc, the control device 20 assigns identifiers (IDs) "IDa," "IDb," and "IDc" to the electric units 30a, 30b, and 30c, respectively.

At step S520, the control device 20 informs the respective electric units 30 of the thus-assigned (set) identifiers (IDs) by sending signals indicating the identifiers (IDs) to the electric unit 30 (processing units 33) via the communication ports P2, respectively. At step S595, the process is finished.

As described above, when the plural electric units 30 are connected to the respective counterpart connectors 60, identifiers (IDs) are set for the electric units 30 on the basis of the magnitudes of ID setting voltages Vid, respectively. After being assigned the identifier (ID), each electric unit 30 that is connected to the counterpart connector 60 allows the electric device 40 that it relays to operate, according to an instruction from the control device 20. This will be described below.

The processing unit 33 sends a signal that it has received from the switch or the like 50 via the signal wire w4 and the signal port P4, to the control device 20 via the communication port P2, the communication wire w2, and the communication wire W2. The processing unit 33 may send, to the control device 20, the signal received from the switch or the like 50 either without performing any processing on it or performing some processing (e.g., signal smoothing) on it. Receiving the signal that originates from the switch or the like 50, the control device 20 determines a target operation amount of the electric device 40 on the basis of the received signal and sends a signal indicating the target operation amount to the processing unit 33 via the communication wire W2, the communication wire w2, and the communication port P2. Receiving this signal from the control device 20, the processing unit 33 generates a drive signal according to the target operation amount and gives the generated drive signal to the drive unit 34. The term "target operation amount" is a concept that includes a target value of the operation amount (e.g., a motor rotation speed) and target on/off timing of the electric device 40.

Receiving the drive signal, the drive unit 34 drives the plural switching elements (FETs) provided in itself on the basis of the drive signal. As a result, the electric device 40 that is connected to the drive unit 34 via the signal ports P6 and P6 and the signal wires w5 and w6 according to an instruction (target operation amount) from the control device 20. The drive unit 34 may be configured so as to have a switching circuit composed of four switching elements (FETs). An example switching circuit is a full-bridge circuit (what is called an H-bridge circuit) and a half-bridge circuit.

It can be said that each electric unit 30 receives a signal indicating a target operation amount from the control device 20 via the communication port P2, prepares operation power corresponding to the target operation amount using power received via the power port P1, and supplies the operation power to the associated electric device 40 via the signal ports P5 and P6.

Embodiment 2

Next, a vehicular communication system (hereinafter referred to as a "communication system 2") according to a second embodiment of the invention will be described below. Constituent elements of the second embodiment that are substantially the same as of the first embodiment will be given the same reference symbols as the latter, and detailed descriptions therefor will be omitted.

In the above-described first embodiment, as shown in FIGS. 2 and 3, the setting circuit is formed as a circuit that is independent of (i.e., separate from) the communication wire (i.e., the communication wire W2 of the wire harness W/H) for communication between the control device 20 and the plural electric units 30. Alternatively, as shown in FIGS. 6 and 7 which correspond to FIGS. 2 and 3, respectively, a setting circuit may be formed so as to include part of the communication wire W2 for communication between the control device 20 and the plural electric units 30.

Figure 6:
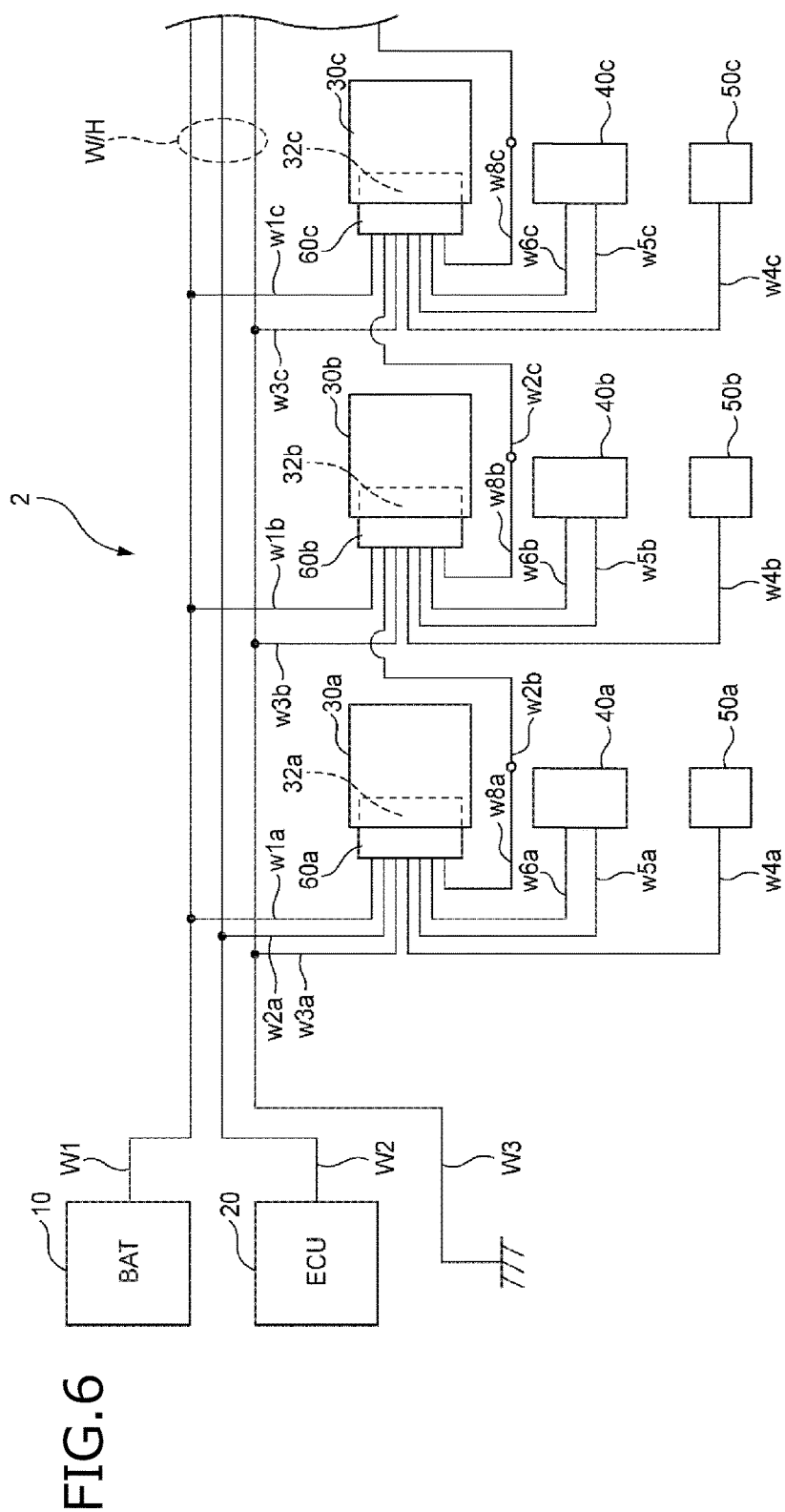
FIG. 6 is a block diagram outlining a communication system according to a second embodiment of the invention.
Figure 7:
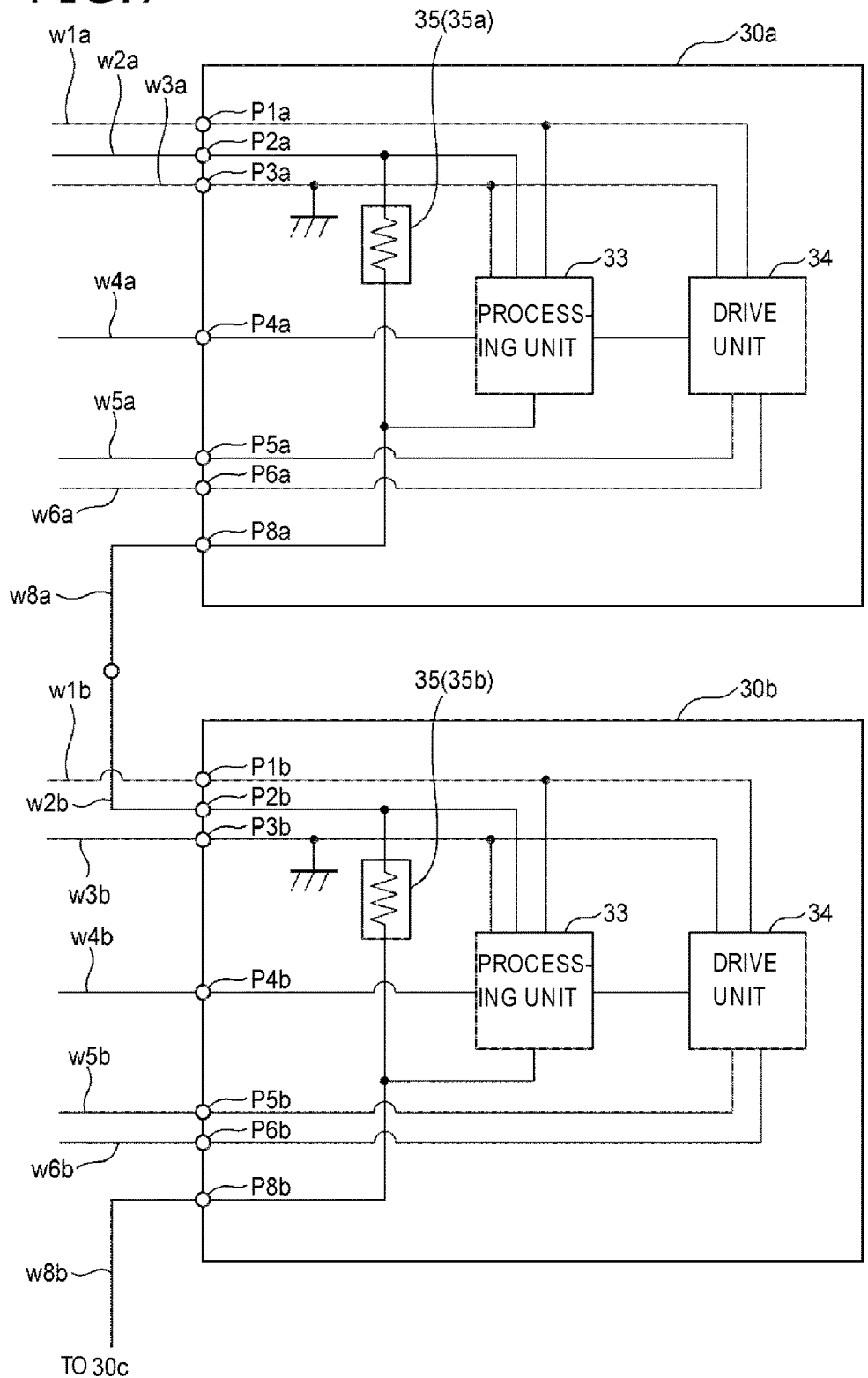
FIG. 7 is a functional block diagram of part of the electric units shown in FIG. 6.

More specifically, in the embodiment shown in FIGS. 6 and 7, each electric unit 30 does not have the signal wire w7 and the signal port P7 and one end of the resistor 35 is connected to the communication port P2 instead of the signal port P7. The other end of the resistor 35 is connected to the signal port P8 as in the first embodiment.

In this embodiment, the other end of the communication wire w2a relating to the most upstream electric unit 30a is connected to the communication wire W2 as in the first embodiment. The other end of the communication wire w8a relating to the most upstream electric unit 30a is connected to the other end of the communication wire w2b relating to the electric unit 30b which is located immediately downstream of the electric unit 30a. The other end of the communication wire w8b relating to the electric unit 30b is connected to the other end of the communication wire w2c relating to the electric unit 30c which is located immediately downstream of the electric unit 30b. The other end of the communication wire w8c relating to the electric unit 30c is connected to the other end of a communication wire w2 relating to an electric unit 30 (not shown) that is located immediately downstream of the electric unit 30c if it exists.

As described above, in each of the electric units 30 other than the most upstream electric unit 30a, the other end of the communication wire w2 is connected to the signal wire w8 of the electric unit 30 that is located immediately upstream of the electric unit 30 concerned instead of the communication wire W2. That is, a communication wire for communication between the control device 20 and the plural electric units 30 forms a circuit "the control device 20→the communication wire W2 of the wire harness W/H→communication wire w2a→resistor 35a→signal wires w8a and w2b→resistor 35b→signal wires w8b and w2c→resistor 35c→signal wire w8c→ground."

In other words, it can be said that the setting circuit is formed so as to include part of the communication wire W2 for communication between the control device 20 and the plural electric units 30. Using this setting circuit, identifiers (IDs) of the respective electric units 30 can be set according to the same principle as in the first embodiment.

As described above, in the embodiment shown in FIGS. 6 and 7, by utilizing, as part of the setting circuit, part of the communication wire w2 for communication between the control device 20 and the plural electric units 30, the overall configuration of the communication system 2 is simplified, as a result of which, for example, reduction of the cost of constructing the communication system 2 is expected.

However, in this embodiment, unlike in the first embodiment, as the connection position of the electric unit 30 goes downstream, the reference voltage of the communication wire w2 for communication decreases gradually due to the voltage drops in the upstream resistors 35. This may cause attenuation of a control signal that travels through the communication wires. This problem can be solved by employing switches for bypassing the respective resistors 35 and turning on this switches after setting of identifiers (IDs).

In the communication systems 1 and 2 according to the first and second embodiments, the setting circuit in which the resistors 35 of the respective electric units 30 are connected to each other is formed and identifiers (IDs) of the respective electric units 30 are set according to the magnitudes of voltages Vid of the resistors 35 of the setting circuit. That is, no identifiers (IDs) are set for the electric units 30 in advance and identifiers (IDs) are set for the respective electric units 30 after installation of the electric units 30 in the communication system 1 or 2. The installation of the electric units 30 in the communication system 1 or 2 and the assignment of identifiers (IDs) are made easier than in the case of using electric units that are assigned identifiers (IDs) in advance.

Although each electric unit 30 has the function of allowing the electric device 40 that it relays to operate, it does not determine an operation amount of the electric device 40 on its own and allows the associated electric device 40 to operate according to an instruction from the control device 20. As such, each electric unit 30 is more versatile than in the case that each electric unit determines an operation amount of the associated electric device on its own.

Since unlike conventional electric units each electric unit 30 allows the associated electric device 40 to operate according to an instruction from the control device 20 (need not be provided with a function of making a judgment as to operation of the electric device 40), the configuration of the control IC (processing unit 33) can be made simpler than in conventional control units. For example, the number of gate circuits (or gate ICs) can be made smaller than in conventional control units. Furthermore, depending on the processing to perform, each electric unit 30 can be a logic IC that is simpler in configuration than what is called microcomputers etc.

Each electric unit 30 sends, to the control device 20, a signal that is supplied from the associated switch or the like 50 and is to be used for allowing operation of the electric device 40 to relay (i.e., the electric unit 30 does not use the signal to make a judgment). This makes each electric unit 30 even more versatile than in the case that a control unit turns on/off the electric device that it relays by making a judgment on its own on the basis of a signal supplied from the associated switch or the like.

In the communication systems 1 and 2, the electric units 30 are equipped with the respective resistors 35 having the same resistance. With this measure, each electric unit 30 can be made lower in manufacturing cost and higher in versatility than in a case that the resistance of the associated resistor varies from one electric unit to another (i.e., the electric units have different specifications).

<Other Modes>

The invention is not limited to the above embodiments, and various modifications, improvements, etc. can be made as appropriate without departing from the spirit and scope of the invention. The material, shape, dimensions, number (where plural ones are provided), location, etc. of each constituent element of each embodiment are optional and no limitations are imposed on them as long as the invention can be implemented.

For example, the invention can be applied to the vehicular circuit bodies that are disclosed in other applications of the present applicant such as Japanese Patent Application Nos. 2016-131165, 2016-131166, and 2016-131167 all of which were filed on Jun. 30, 2016.

Although in each of the above embodiments the resistors 35 have the same resistance, it may vary from one electric unit 30 to another. As is understood from the above description (in particular, FIGS. 4A and 4B), even if the resistors 35 have different resistances, identifiers (IDs) can be assigned according to the magnitude relationships between ID setting voltages Vid, in the same manner as in the embodiments.

In each of the above embodiments, each electric unit 30 receives, from the associated switch or the like 50, a signal that relates turning on/off of the electric device 40 that it relays. Alternatively or in addition, each electric unit 30 may receive, by proxy, a signal from a switch or the like 50 that relates to turning on/off of an electric device that is different from the electric device 40 that it relays and sends the received signal to the control device 20 (what is called proxy input).

In each of the above embodiments, each electric unit 30 is connected to the associated electric device 40 via the signal wires w5 and w6. Alternatively, each electric unit 30 may be connected to the associated electric device 40 directly, that is, without intervention of any signal wires. For example, this configuration can be realized by fitting and connecting a connector portion of the electric device 40 into or to a second connector portion of the electric unit 30. This configuration can make the cost lower than in the case that each electric unit 30 is connected to the associated electric device 40 via signal wires etc.

In each of the above embodiments, a signal that each electric unit 30 receives from the associated switch or the like 50 via the signal port P4 is sent to the control device 20 via the processing unit 33. Alternatively, a signal that each electric unit 30 receives from the associated switch or the like 50 via the signal port P4 may be sent to the control device 20 without intervention of the processing unit 33. Furthermore, although each electric unit 30 is equipped with the signal port P4 that is connected to the associated switch or the like 50, the signal port P4 may be omitted. In this case, the communication system 1 or 2 may be configured in such a manner that the control device 20 directly receives a signal coming from the switch or the like 50.

The features of the communication systems 1 and 2 according to the embodiment of the invention will be summarized below concisely in the form of items (1)-(4):

(1) A communication system (1, 2) including:
a control device (20); and
a plurality of electric units (30) configured to be connected to the control device (20) respectively to communicate with each other, and each of the plurality of electric units (30) having a unique identifier (ID), wherein:
each of the plurality of electric units (30) includes a resistor (35) configured to set the corresponding identifiers (ID),
the respective resistors (35) of the plurality of electric units (30) are connected to each other in series to form a setting circuit, and
the control device (20) is configured to determine the corresponding identifiers (ID) of the plurality of respective electric units (30) based on magnitudes of respective voltages (Vid) applied to the plurality of respective resistors (35) in the setting circuit, and to send signals indicating the determined identifiers (IDs) to the plurality of electric units (30), respectively.

(2) The communication system (1, 2) according to item (1), wherein:
the control device (20) configured to determine target operation amounts of a plurality of electric devices (40) that are control targets of the communication system (1,2),
each of the plurality of electric units (30) includes:
a communication port (P2) that is disposed so as to relay between a corresponding one of the plurality of electric devices (40) and the control device (20), and is configured to be connected to a communication wire (W2) connected to the control device (20);
a power port (P1) that is configured to be connected to a power wire (W1) connected to an external power source (10),
a ground port (P3) that is configured to be connected to a ground wire (W3),
electric device ports (P5, P6) configured to output power to the corresponding ones of the plurality of electric devices (40), and
setting ports (P7, P8) configured to constitute the setting circuit, and
each of the plurality of electric units (30) receives a signal indicating the corresponding target operation amount from the control device (30) via the corresponding communication port (P2), prepares operation power corresponding to the target operation amount using power received via the corresponding power port (P1), and controls the corresponding one of the plurality of electric devices (40) to operate so that an actual operation amount of the corresponding one of the plurality of electric devices (40) becomes equal to the corresponding target operation amount by supplying the prepared power to the corresponding one of the plurality of electric devices (40) via the corresponding one of the electric device ports (P5, P6).

(3) The communication system (1, 2) according to item (2), wherein:
the setting circuit includes a part of the communication wire for communication between the control device and the plurality of electric units (30) or is constituted as a circuit that is independent of and separate from the communication wire (W2).

(4) The communication system (1, 2) according to any one of items (1)-(3), wherein:
the respective resistors (35) of the plurality of electric units (30) have the same resistance.

What is claimed is:

1. A communication system comprising:
a control device; and
a plurality of electric units configured to be connected to the control device respectively to communicate with each other, and each of the plurality of electric units having a unique identifier, wherein:
the each of the plurality of electric units comprises a resistor configured to set the corresponding identifiers,
the respective resistors of the plurality of electric units are connected to each other in series to form a setting circuit, and
the control device is configured to determine the corresponding identifiers of the plurality of respective electric units based on magnitudes of respective voltages applied to the plurality of respective resistors in the setting circuit, and to send signals indicating the determined identifiers to the plurality of electric units, respectively.

2. The communication system according to claim 1, wherein:
the control device configured to determine target operation amounts of a plurality of electric devices that are control targets of the communication system,
the each of the plurality of electric units comprises:
a communication port that is disposed so as to relay between a corresponding one of the plurality of electric devices and the control device, and is configured to be connected to a communication wire connected to the control device;
a power port that is configured to be connected to a power wire connected to an external power source,
a ground port that is configured to be connected to a ground wire,
electric device ports configured to output power to the corresponding ones of the plurality of electric devices, and
setting ports configured to constitute the setting circuit, and
the each of the plurality of electric units receives a signal indicating the corresponding target operation amount from the control device via the corresponding communication port, prepares operation power corresponding to the target operation amount using power received via the corresponding power port, and controls the corresponding one of the plurality of electric devices to operate so that an actual operation amount of the corresponding one of the plurality of electric devices becomes equal to the corresponding target operation amount by supplying the prepared power to the corresponding one of the plurality of electric devices via the corresponding one of the electric device ports.

3. The communication system according to claim 2, wherein:
the setting circuit includes a part of the communication wire for communication between the control device and the plurality of electric units or is constituted as a circuit that is independent of and separate from the communication wire.

4. The communication system according to claim 1, wherein:
the respective resistors of the plurality of electric units have the same resistance.

* * * * *